Dec. 13, 1932.  L. E. SIMPSON ET AL  1,890,868
ATTACHMENT FOR PARACHUTES
Original Filed Jan. 10, 1930

Inventor
Lewis E. Simpson,
Charles H. Bartholomew,

By Clarence A. O'Brien
Attorney

Patented Dec. 13, 1932

1,890,868

UNITED STATES PATENT OFFICE

LEWIS E. SIMPSON AND CHARLES H. BARTHOLOMEW, OF WICHITA, KANSAS

ATTACHMENT FOR PARACHUTES

Application filed January 10, 1930, Serial No. 419,855. Renewed April 26, 1932.

This invention relates broadly to parachutes, and has more particular reference to the provision of means for facilitating the initial opening of a parachute.

In brief, the invention consists of an endless steel ring fastened to the parachute at the center of the parachute concentrically therewith, together with an annular series of similar rings of smaller diameter fastened to the parachute at its circumferential edge, which ring, when holding the parachute to form a pack or first manipulated or twisted, as to assume the shape corresponding to an 8, after which at the neck or intermediate part of the 8, the rings are folded or bent double upon themselves forming, as it were, the letter O.

By so doing, and holding the wire rings in the position of a letter O, the rings will automatically unfold themselves to assume their original figure when the parachute is released from the pack.

Other objects and advantages of the invention will become apparent during a study of the following description, taken in connection with the accompanying drawing wherein:—

Figure 1:
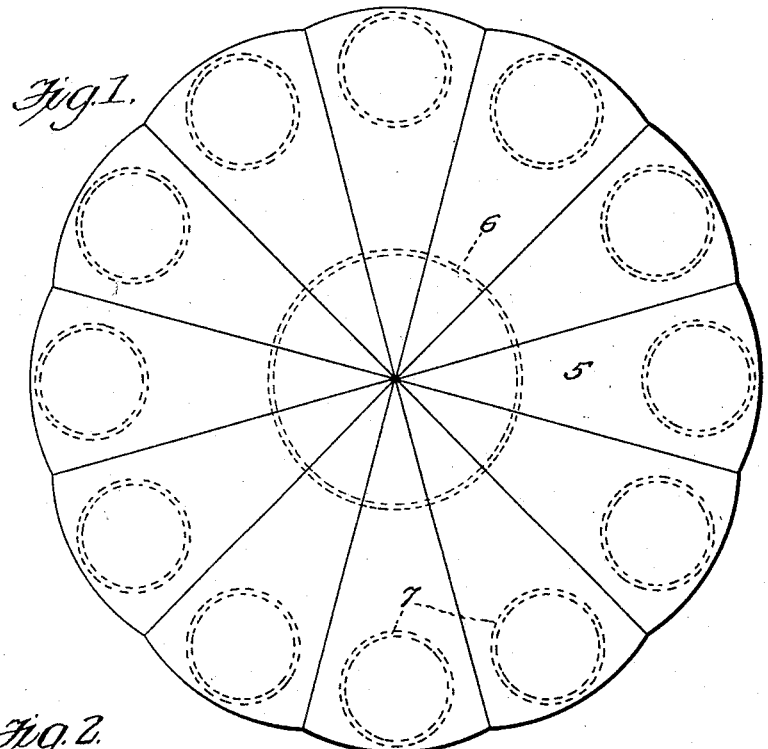
Figure 1 is a top view of a parachute in open position, illustrating the application of our invention thereto.

With reference more in detail to the drawing, it will be seen that the parachute is generally designated by the reference character 5, and the same is of the usual shape and formation, being formed of conventional material of which parachutes are made, and being substantially circular in formation.

In applying our invention to the parachute, there is provided a relatively large resilient steel spring endless ring 6 secured to the parachute 5, and arranged centrally thereof, concentrically of the parachute. In addition, there is provided an annular series of relatively smaller resilient steel springs, endless rings 7, arranged adjacent the peripheral edge of the parachute. The ring 6, and rings 7, are stitched or otherwise secured to the parachute 5.

While we have designated the center rings 6, and the annular series of rings by the numeral 7, it will be understood that these rings are formed of similar material, being of endless steel spring wire, the only difference being that the center 6, is of greater diameter than the rings 7, and hence in the following description, referring to Figs. 2 to 5 inclusive, we have designated the rings therein shown by the numeral 6, and since the rings 6 and 7 are all to be manipulated in the same identical manner, it is thought that the reference to the single ring 6, will suffice.

Figure 2:
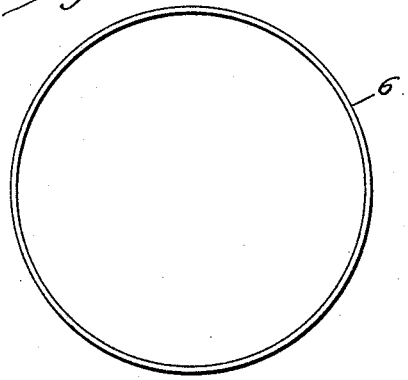
Fig. 2 is a plan view of the steel ring in its normal position.

Thus it will be seen, that in Fig. 2, the ring 6, as before intimated, is endless, and probably formed of steel spring wire, and as shown in Fig. 2, the ring 6 is in its normal position, and which in that position is retained when the parachute is fully opened.

As is well known in the art, the parachutes are folded in neat compact bundles known as a pack, and through suitable means are preferably automatically opened when in use. It is to facilitate the initial opening of the parachute that render these rings 6 and 7 advantageous.

Figure 3:
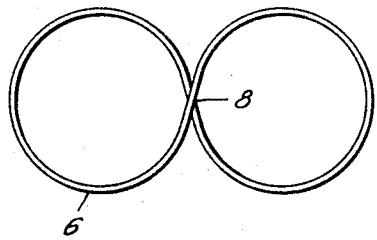
Fig. 3 is a plan view of the ring twisted to assume the figure 8, the first step in the application of the invention.
Figure 4:
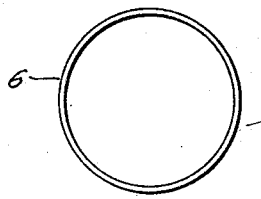
Fig. 4 is a plan view of the ring illustrating the second step in the manipulation of the ring when folding the parachute.
Figure 5:
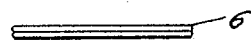
Fig. 5 is an edge elevation of the ring at the completion of the second step in the folding or reduction in diameter of the ring.

In use, in folding the parachute into a pack, the ring 6, as well as the rings 7, by grasping the rings at diametrical opposite sides, and then by properly manipulating the hands, the ring is twisted to assume that position shown in Fig. 3, that is, so as to simulate the figure 8, after which, at the points 8 in Fig. 3, which point 8 is where the ring crosses itself in forming the circular part of the 8 or the neck of the same, is then folded upon itself, as to provide an annulus or ring of considerably reduced circumference as compared with the original circumference of the ring, thus forming somewhat of a double looped annulus as shown to advantage in Figs. 4 and 5.

When the ring 6, and the rings 7, have each been reduced to that condition shown in Fig. 5, the parachute 5 will have been completely folded into a pack, and the rings will remain in this condition until the parachute is to be brought into use, that is, to be opened up.

At such time, it is obvious that as soon as any actuation is given to the parachute to cause it to open, the double loops will have a tendency to spring apart to finally assume their original condition, or that condition shown in Fig. 2, at which time the parachute will be completely opened.

It is thought that from the foregoing description, taken in connection with the accompanying drawing, a clear understanding of the operation, construction, material and advantages of an invention of this character will be had, to those skilled in the art, without a more detailed description.

Even though we have herein shown and described the preferred embodiment of our invention, it is to be understood that the same is susceptible of changes, fully comprehended by the spirit of the invention as herein described and the scope of the appended claims.

Having thus described our invention, what we claim as new is:—

1. In combination, a parachute, an endless resilient ring of relatively large diameter fastened to the parachute concentrically of the parachute, an annular series of similar rings of relatively smaller diameter secured to the parachute concentrically of the first-mentioned ring, said rings being foldable upon themselves when the parachute, is in a folded condition, and said rings having an inherent tendency to return to their normal unfolded condition for effecting an opening of the parachute.

2. Means for initially opening a parachute, comprising a relatively large spring ring secured to the parachute at the crown thereof, and an annular series of relatively small spring rings secured to the skirt of the parachute adjacent the edge thereof, all of said rings respectively being capable of folding into a plurality of concentric annuli.

3. Means for initially opening a parachute comprising an annular series of spring rings secured to the skirt of the parachute, each of said rings being capable of folding into a plurality of concentric annuli.

In testimony whereof we affix or signatures.

LEWIS E. SIMPSON.
CHARLES H. BARTHOLOMEW.